United States Patent [19]

Harris et al.

[11] Patent Number: 5,432,412
[45] Date of Patent: Jul. 11, 1995

[54] SECURITY DEVICE FOR A CART WHEEL

[75] Inventors: Charles D. Harris, Loomis, Calif.;
David Fulton, 6030 Jeremy Ct.,
Carmichael, Calif. 85608

[73] Assignee: David Fulton, Carmichael, Calif.

[21] Appl. No.: 154,972

[22] Filed: Nov. 19, 1993

[51] Int. Cl.⁶ .......................... B62H 5/14; B60R 25/08
[52] U.S. Cl. .......................................... 318/3; 318/16;
70/226; 188/69; 280/33.994
[58] Field of Search ................ 318/3, 362, 16; 70/225,
70/226, 271; 188/1.12, 19, 31, 69, 158, 162;
194/905; 280/33.994; 340/425.5, 426

[56] References Cited

U.S. PATENT DOCUMENTS

| | | | |
|---|---|---|---|
| 3,002,370 | 10/1961 | La Brie | 70/183 |
| 3,394,945 | 7/1968 | Steier et al. | 280/33.99 |
| 3,475,036 | 10/1969 | Smith | 280/33.99 |
| 3,590,962 | 7/1971 | Parker et al. | 188/111 |
| 3,652,103 | 3/1972 | Higgs . | |
| 3,873,902 | 3/1975 | Burch | 318/594 |
| 3,892,295 | 7/1975 | Hahto | 188/111 |
| 4,327,819 | 5/1982 | Coutta | 186/62 |
| 4,524,985 | 6/1985 | Drake | 280/33.9 |
| 4,577,880 | 3/1986 | Bianco | 280/33.99 |
| 4,629,950 | 12/1986 | Ching | 318/285 |
| 4,772,880 | 9/1988 | Goldstein et al. | 340/571 |
| 4,868,544 | 9/1989 | Havens | 340/572 |
| 5,194,844 | 3/1993 | Zelda | 340/426 |

*Primary Examiner*—Bentsu Ro
*Attorney, Agent, or Firm*—Bielen, Peterson & Lampe

[57] ABSTRACT

A security device for a cart wheel utilizing a housing which is mounted to the cart in the vicinity of the wheel. A locking element supported to the housing and is selectively movable into positions engaging the cart wheel or being disengaged from the cart wheel. A motor is employed to move the element in such reciprocal motion and is operated by a controller. The controller includes a counter to determine the number of revolutions completed by the wheel, and a trigger for starting the motor upon receipt of a signal from the counter representing a preselected number of revolutions completed by the wheel.

13 Claims, 5 Drawing Sheets

SECURITY DEVICE FOR A CART WHEEL

BACKGROUND OF THE INVENTION

The present invention relates to a novel and useful security device for a cart wheel.

Shopping carts are a necessary item of equipment for shopping in modern market places. Normally, a shopper utilizes a cart to transport items to be purchased. For example, a shopping cart is normally passed through a check-out stand carrying purchased goods to a vehicle parked at the exterior of the mart. Unfortunately, many shopping carts are damaged in the parking area or stolen therefrom. Such a loss is substantial since shopping carts are relatively expensive to acquire and maintain.

The following prior art references are cited as believed to be pertinent to the present application.

U.S. Pat. No. 4,524,985 describes an anti-theft device for a cart which utilizes a hook connected to the frame of the cart which engages a corresponding slot in a ground surface mounted grate.

U.S. Pat. No. 4,577,880 describes a theft prevention apparatus for a shopping cart which is actuated upon proximity to an installed device creating a magnetic field.

U.S. Pat. No. 3,002,370 shows an axle lock which is manually operated.

U.S. Pat. No. 3,475,036 shows a travel limiting device for a shopping cart utilizing a stop roller that rotates laterally on a threaded member.

U.S. No. Pat. No. 3,892,295 describes a wheel lock for a cart having a small actuating wheel which actuates when a sufficient downward clearance is encountered.

U.S. Pat. No. 5,194,844 describes a vehicle theft protection device for a shopping cart that operates when movement of the shopping cart is electronically detected outside a perimeter area.

U.S. Pat. 4,772,880 uses an electronic receiver carried by the cart to sense the movement of the shopping cart beyond a perimeter area. A signal then locks the cart against further movement.

U.S. Pat. 4,868,544 shows a shopping cart retrieval system that employs a VHF radio receiver with an omnidirectional antenna to allow persons to detect the presence of the shopping cart remotely from a store.

U.S. Pat. 3,590,962 and 3,394,945 employ mechanical gear mechanisms to count or clock wheel revolutions. After a pre-determined number of revolutions of the wheel, the shopping carts are locked against further movement.

A locking device for a shopping cart which utilizes electronic means to determine the distance traveled would be a notable advance in the field of cart locking devices.

SUMMARY OF THE INVENTION

In accordance with the present invention a novel and useful cart locking device is herein provided.

The locking or security device includes a housing which is capable of being held to the cart in the vicinity of a cart wheel. In certain embodiments, the housing and cart wheel may be formed as a unit in substitution for a wheel found on a cart, such as a shopping cart. A locking element is also supported to the housing and is capable moving into positions engaging the cart wheel and being disengaged from the cart wheel. Such element may take the form of a pin which engages a portion of the hub of the wheel of the cart. Motor means is employed for moving the element back and forth through a lever which may be cam operated. In certain cases, the movable element may simply frictionally engage the wheel a sliding fashion. In other words, the locking element would act as a brake rather than a stop for the cart wheel.

Control means is also included for activating the motor at a pre-determined instant. A counter may be employed in this regard to determine the number of revolutions completed by the wheel. A magnet may be located on the cart wheel for actuating a switch supported on the housing adjacent the cart wheel.

The control means of the present invention further includes trigger means for starting the motor in a certain direction upon receipt of a signal from the counter representing a pre-selected number of revolutions completed by the wheel. The trigger means would be connected to a source of electrical power in order to activate the motor when the trigger operates. The present invention may be further deemed to encompass count setting means for arming the trigger mechanism based on a pre-selected number of revolutions completed by the wheel.

Further, the control means may also be provided with means for activating and securing the control means. Such securing means may take the form of a code generator.

A receiver is also employed in the control means which operates in conjunction with a signal transmitter. For example, the receiver recognizes a code originating with the code generator. The receiver, upon receipt of a signal from a transmitter, could also produce a signal, through a decoder capable of functioning to ACTIVATE, DEACTIVATE, LOCKUP, UNLOCK, and SECURE the device of the present invention. In addition, the transmitter receiver combination may be employed to function in a SET COUNT mode to determine the distance the wheel will be permitted to roll before the LOCKUP mode is triggered.

It may be apparent that a novel and useful security device for a cart wheel has been described.

It is, thus, an object of the present invention to provide a security device for a cart wheel which is capable of electronically determining a pre-selected number of revolutions of the wheel and triggering a locking element to either brake or engage the cart wheel to prevent further movement.

Another object of the present invention is to provide a security device which limits the range of a shopping cart in order to preclude such cart from leaving the shopping area.

Another object of the present invention is to provide a security device for a cart wheel which is capable of preventing movement of a shopping cart upon traveling of a certain distance or upon receipt of a signal.

Yet another object of the present invention is to provide a security device for a cart wheel which is easily adaptable for installation on existing shopping carts.

Yet another object of the present invention is to provide a security device for a cart wheel which is capable of operating in multiple modes and may be manipulated remotely.

Another object of the present invention is to provide a security device for a cart wheel that is less susceptible to moisture than devices of the prior art.

Another object of the present invention is to provide a security device for a cart wheel which is adaptable to lock or brake a wheel, as well as to sound an alarm within a present perimeter.

The invention possesses other objects and advantages especially as concerns particular characteristics and features thereof which will become apparent as the specification continues.

For a better understanding of the invention, references made to the following detailed description of the preferred embodiments thereof.

DETAILED DESCRIPTION OF THE PREFERRED EMBODIMENTS

Various aspects of the present invention will evolve from the following detailed description of the preferred embodiments which should be taken in conjunction with the prior described drawings.

Figure 1:
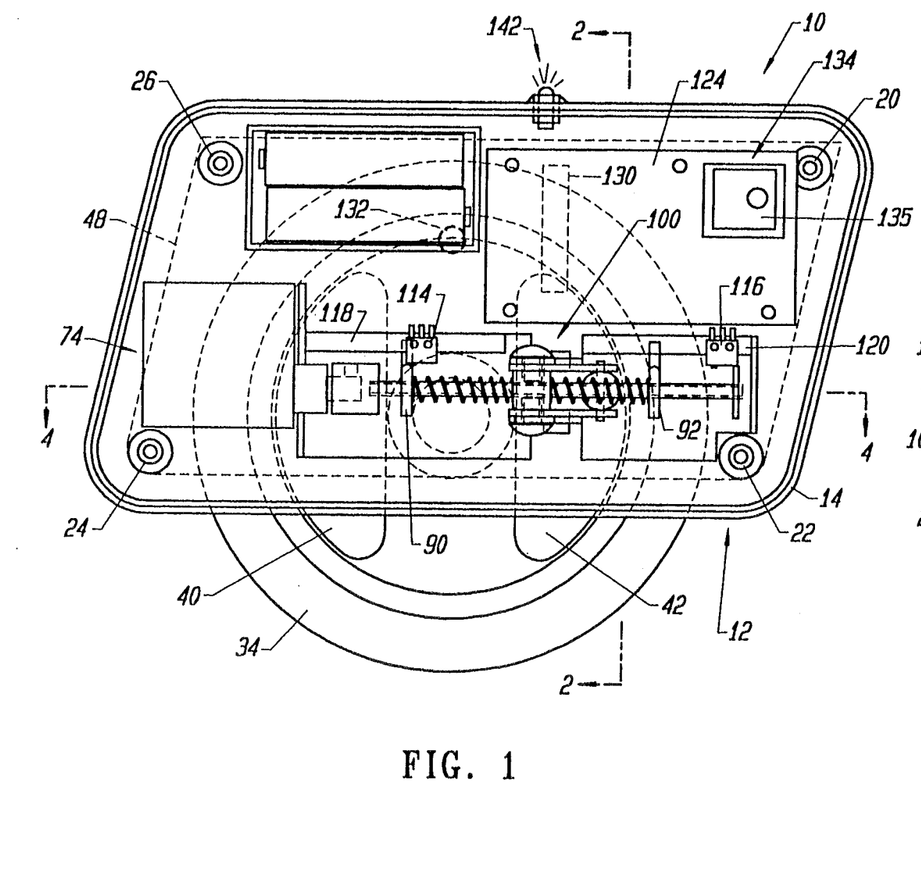
FIG. 1 is a side elevational view of the security device of the present invention with the front cover removed from the housing.

The invention as a whole is depicted in the drawings by reference character 10. The security device 10 includes as one of its element a housing 12 having a rear portion 14 and a front cover 16. With reference to FIG. 1, a quartet of standoffs 20, 22, 24, and 26 link rear portion 14 to cover 16 by the use of a plurality of threaded bolts 28, FIGS. 1 and 2. Housing 12 is fastened to a fork or yoke or wheel carrier having a bolt axle 32 for wheel 34. Wheel 34 includes a core or hub 36 circumvented by a tire 38. Hub 36 is formed with a pair of recesses 40 and 42 on one side of hub 36. Recesses 44 and 46 lie on the opposite side of hub 36.

Figure 2:
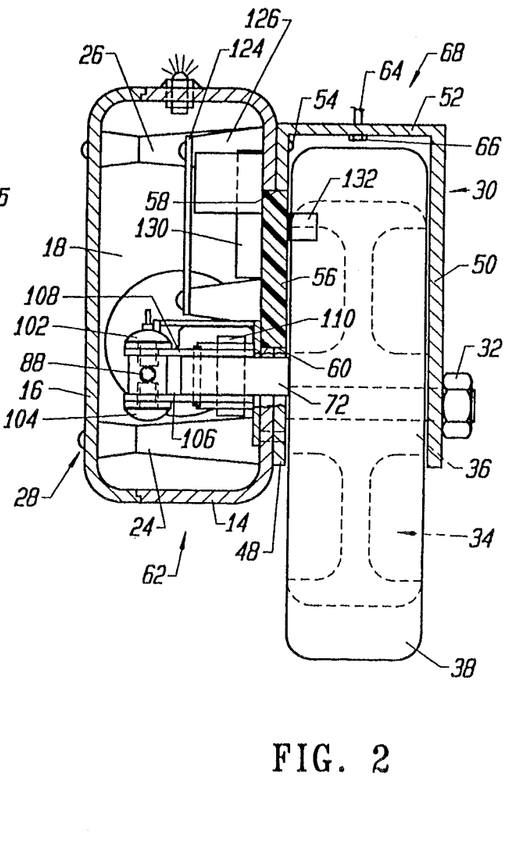
FIG. 2 is a sectional view taken along line 2—2 of FIG. 1.

Stand-offs 20, 22, 24, and 26 also serve to connect yoke 30 to housing 12. In this regard, yoke 30 is formed by side portions 48 and 50 linked by a top plate 52. Turning now to FIGS. 1 and 2, it may be observed that side portion 48 is generally trapezoidal shaped to generally conform to the shape of rear portion 14 of housing 12. A plurality of fasteners such as fastener 54 threadingly engage any one of the stand-offs such as stand-off 26. Back portion 14 and yoke side portion 48 include the requisite number of threaded recesses for this purpose.

In addition, plug 56 is employed to friction fit within apertures 58 and 60 in housing 12 and side portion 48 of yoke 30, respectively. Thus, plug 56 represents a non-metallic bridge between the interior of yoke 30 and the interior 18 of housing 12, transparent to a magnetic field. Consequently, yoke 30, possessing connected and rotatable wheel 34 and housing 12, form a unit 62.

Unit 62 may be mounted to a cart such as a shopping cart 70, by the use of shaft 64 which is held to top 52 by nut 66. Shopping cart 70 is depicted with a pair of units 62 substituted for the original rear wheels, FIG. 3. Thus, shaft 64 and nut 66 serve as mounting means 68 for holding housing 12 and wheel 34 to cart 70. In certain cases, a single unit 62 may suffice to secure shopping cart 70.

Figures 3, 4, 5, 5A:
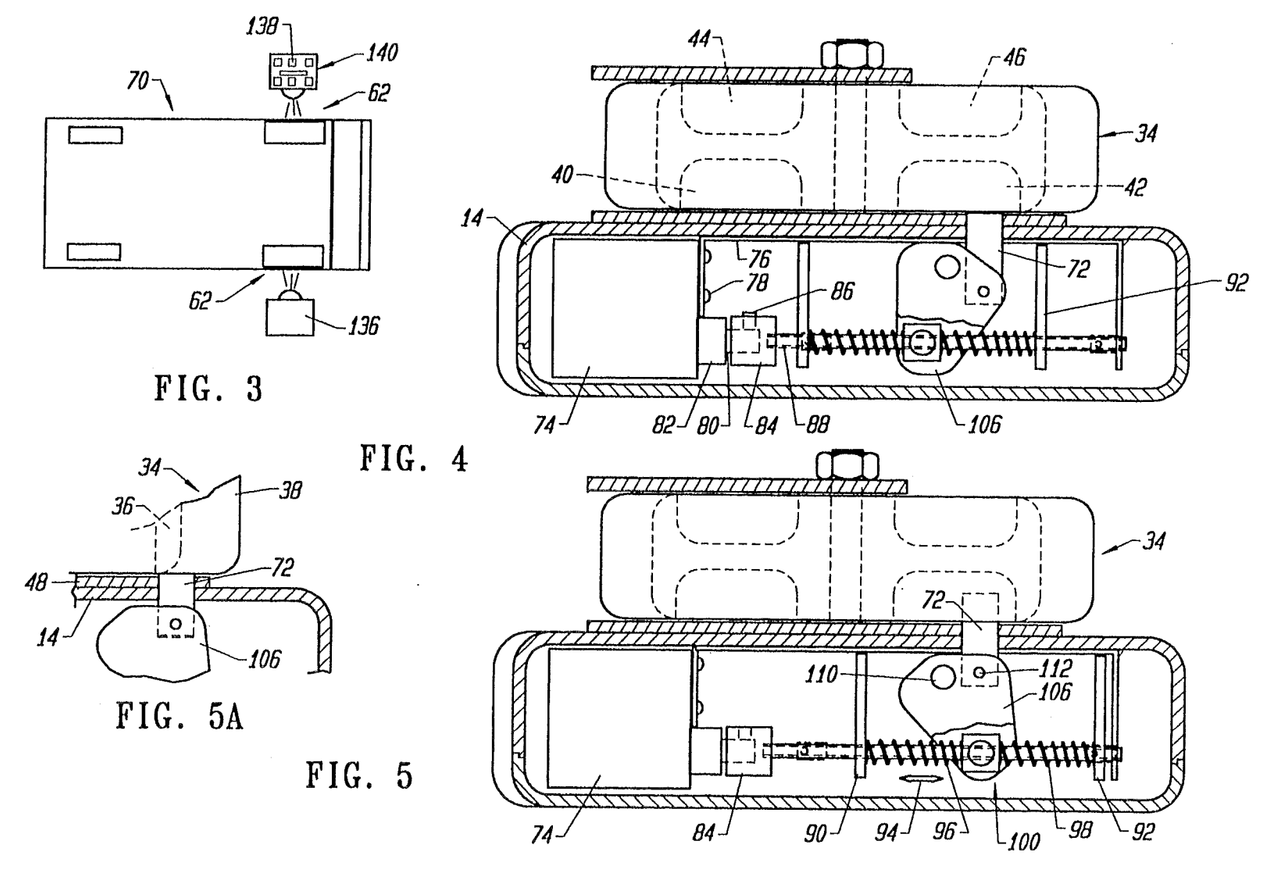
FIG. 3 is a top plan view of a shopping cart having a pair of security devices of the present invention installed thereupon.
FIG. 4 is a sectional view taken along the line 4—4 of FIG. 1.
FIG. 5 is a sectional view resembling FIG. 4 showing the element engaging the cart wheel against movement.
FIG. 5A is a sectioned view representing an alternate embodiment for braking a cart wheel.

Turning now to FIGS. 1, 4, and 5, it may be observed that device 10 is further provided with an element 72 selectively moveable into positions engaging cart wheel 34 and being disengaged from cart wheel 34. Activation of element 72 originates with gear reduced motor 74 which is motivated by a six Volt DC current source, the details of which will be discussed hereinafter. U-shaped plate 76 is affixed to rear portion 14 of housing 12 by welding, screws, or the like. Motor 74 is bolted to plate 76 by fasteners 78. Motor shaft 80 is supported by bearing 82 and extends outwardly from motor 74. Normally, shaft 80 is capable of turning axially. Collar 84 affixes to shaft 80 via set screw 86 such that collar 84 and shaft 80 rotate as a unit. Collar 84 is connected to a threaded jacking screw 88 which is capable of moving tabs 90 and 92 back and forth according to directional arrow 94. LOCKUP springs 96 and 98 extend between tabs 90 and 92 and a central drive lug 100. Drive lug 100 includes a pair of cap screws 102 and 104 which engage a pair of cam plates 106 and 108. Plates 106 and 108 pivot about pivot pin 110, which serves as a fulcrum for the lever action of plates 106 and 108. Locking element 72 is held between plates 106 and 108 by a roll pin 112. Locking element 72 is capable of extending into recesses 40 and 42 and, thus, is capable of contacting hub 36 to stop the rotation of wheel 34. With reference to FIG. 5A, it may be observed that element 72 may be positioned to pass through rear portion 14 of housing 12 and side portion 48 of yoke 30 to slidingly contact tire 38 of wheel 34. Consequently, element 72 through such sliding engagement of tire 38 would act as a brake rather than a more positive stop by direct engagement of hub 36 of tire 34, described in detail in FIGS. 4 and 5. It should be observed on FIG. 1 that microswitches 114 and 116 contact tabs 90 and 92 at the extreme movement of the same laterally. Such contact activates microswitches 114 and 116, the purpose of which will be described hereinafter. Microswitches 114 and 116 are connected to flanges 118 and 120 which are affixed to U-shaped plate 76.

Control means 122 is also found in the present invention for activating motor 74. Control means 122 is shown schematically on FIG. 6 and is physically located within housing 12 at circuit board 124 held to rear portion 14 by a plurality of stand-offs 126, FIGS. 1 and 2. Circuit board 124 is capable of supporting a majority of components depicted in FIGS. 6.

Figures 6, 6A:
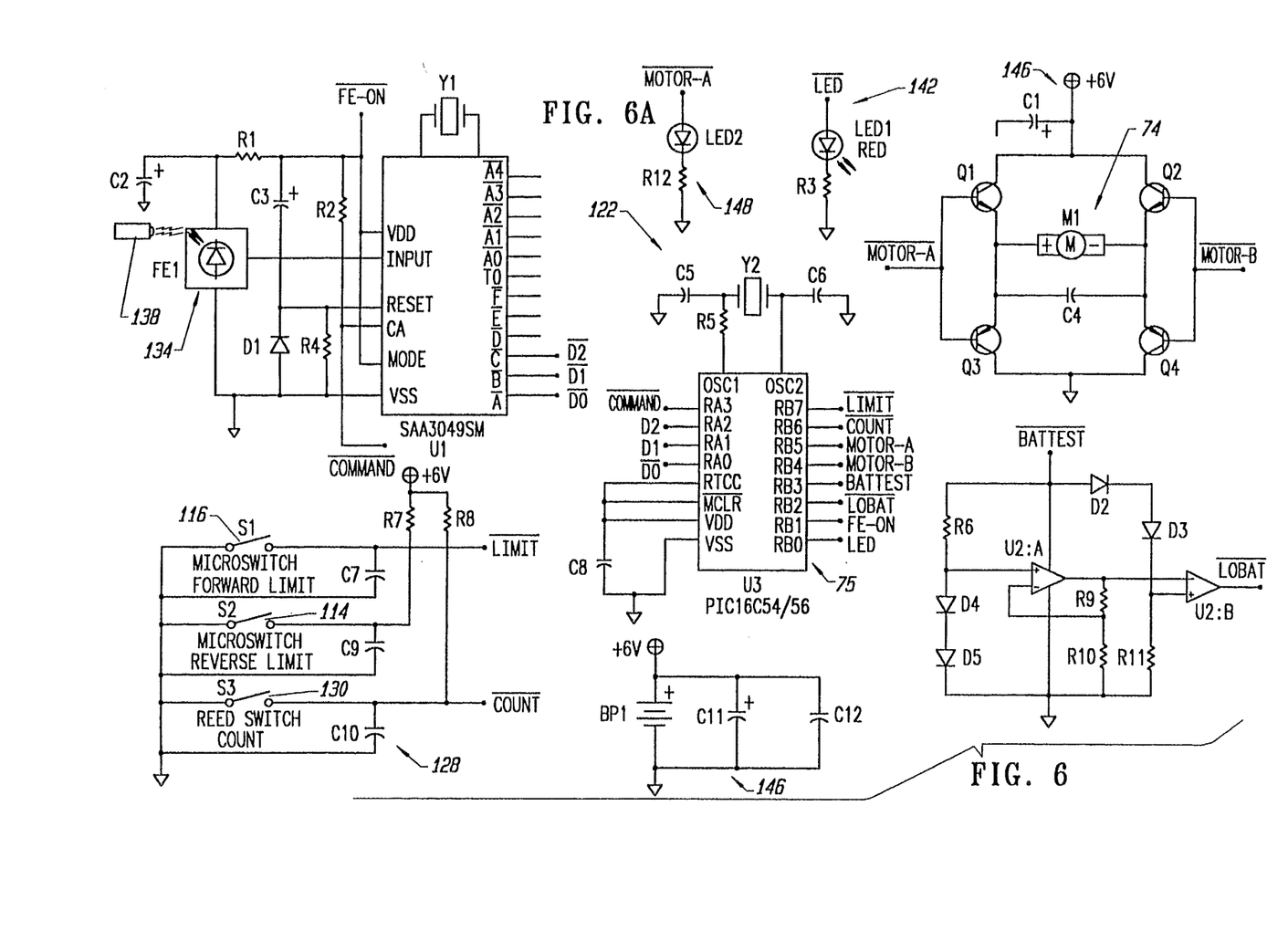
FIG. 6 is a schematic view depicting the control means of the present invention.
FIG.6A is a schematic view of an alternate embodiment of the present invention for an alarm for a cart wheel.

Control means 22 possesses a counter 128, FIGS. 6, in the form of a reed switch 130 also depicted in block form on FIGS. 1 and 2. Reed switch is located adjacent non-metallic plug 56 and is capable of receiving a magnetic pulse from magnet 132 fastened to hub 36 of wheel 34. Infrared receiver 134, FIGS. 1 and 2 is mounted within chamber 18 of housing 12 adjacent circuit board 124. A window 135, thereof, is capable of receiving a discreet infrared signal to initiate the counting function of control means 122. With reference to FIG. 6, the infrared module FE1 is deemed part of receiver 134. With reference to FIG. 3, it may be seen that infrared signal generators 136 and/or 138 may be employed when device 10 on cart 70 is to be activated. Hand held signal generator or transmitter 138 is capable of sending a multiplicity of discrete signals, including a signal activating device 10. For example, transmitter 138 may include a series of buttons 140 corresponding to a particular function to be described hereinafter. Simple activation is initiated when shopping cart 70 passes through a check-out counter or leaves the confines of the store edifice by the use of fixed buttonless transmitter 136, utilizing the same transmitter chip as generator 138.

With reference to FIG. 6, it may be observed that a programmable microprocessor microcomputer U3 is capable of processing various inputs depicted on FIGS. 6. Reed switch 130, S3, produces a count which is depicted as entering microcomputer U3 at pin RB6. Other inputs to U3 are noted on FIG. 6. In the case of reed switch 130, S3, the COUNT input to microcomputer U3 permits microcomputer U3 to compare the reed switch closures with a pre-programmed maximum allowable number under a SET COUNT command. Such SET COUNT command is transmitted to microcomputer U3 via transmitter 138 infrared receiver FE1, and decoder U1. Decoder 1 is tuned by resonator Y1. The output COMMAND of decoder U1 alerts or flags microprocessor U-3 to the subsequent 3-bit binary signals emanating through ports D0, D1, and D2. Such signals correspond to the multiple modes of operation, described hereinafter. Of course, the number of magnetic reed switch 134 closures would correspond to a particular distance traveled by wheel 134 to limit the movement of cart 70 to a particular perimeter of travel. At this point, LED 142 would flash rapidly. With reference to FIGS. 1 and 2, it may be observed that LED 142 is located on housing 12. FIG. 6 describes the connection of LED 142 through resistor R3 to microcomputer U3. It should be noted that resonator Y2 is used to tune microcomputer U3 between resonating capacitors C5, C6, as well as imbalance resistor R5.

Battery pack tester 144 is also linked to microcomputer U3 as depicted in FIG. 6. Battery pack 146 is shown in FIG. 6 as being a six Volt DC battery pack in parallel with capacitors C11 and C12. The battery test is initiated each time the "ACTIVATE" command is received by receiver FE1. The operational amplifier U2 of battery pack tester 144 is shown as being split into operational amplifiers U2A and U2B.

Of course, battery pack BP1 is employed to run motor 74, M-1. The MOTOR-A and MOTOR-B outputs of microprocessor U3 represent movement of motor shaft 80 backward and forward according to directional arrow 94 of FIG. 5. Such signal would occur when the preset wheel rotation count is reached. Thus, microcomputer U-3, serves a trigger means 95 for starting motor 74, M-1. Microswitches 114 and 116 limit the travel of jacking screw 88 when contact is made with tabs 90 and 92, respectively. For example, tab 90 is contacting microswitch 114 on FIG. 1 and is, thus, limiting travel of jacking screw 88 and linked locking element 72 in the forward locking direction. Of course, microswitch 116 would limit the retraction of locking element 72 in the opposite direction. Transistors Q1 and Q3 switch the six-Volt DC power supply to motor 74, M1, when a high MOTOR-A signal and a low MOTOR B are received from microprocessor U3. Q1 is on when Q3 is off and Q4 is on when Q2 is off. Similarly, transistors Q2 and Q4 switch power to initiate the movement of motor 74, M1 in the opposite direction when a high MOTOR-B signal and low motor "A" signal are received from microprocessor U3. When low MOTOR A and MOTOR B signals are sent to microprocessor U3, MOTOR M-1 doesn't operate for lack of continuity.

FIG. 6A illustrates the employment of device 10 as alarm means 148 rather than a locking element 72 for wheel 34 LED-2 may receive the output MOTOR-A from microprocessor U-3 and be lit thereby. It should be apparent that other alarms may be employed such as a sound source, a radio transmitter, and the like, in place of LED-2. In such an instance, motor 74 and the mechanical linkage therefrom to element 72 would not be required. The following table represents a list of typical components used in the circuit depicted in FIG. 6

TABLE I

FIG. 6

| Ref: | Value: | Item: | Origin: |
| --- | --- | --- | --- |
| BP1 | 4X1.5V AA | BATTERY HOLDER | EAGLE, ELK GROVE, IL |
| C1 | 470MFD/16V | ELECTROLYTIC | PANASONIC, JAPAN |
| C2 | 22MFD/16V | ELECTROLYTIC | PANASONIC, JAPAN |
| C3 | 1MFD/16V | ELECTROLYTIC | PANASONIC, JAPAN |
| C4 | .1MFD/MLC | MONOLITHIC CER | PANASONIC, JAPAN |
| C5 | 20PF/100V | CERAMIC DISC | PANASONIC, JAPAN |
| C6 | 20PF/100V | CERAMIC DISC | PANASONIC, JAPAN |
| C7 | .1MFD/MLC | MONOLITHIC CER | PANASONIC, JAPAN |
| C8 | .1MFD/MLC | MONOLITHIC CER | PANASONIC, JAPAN |
| C9 | .1MFD/MLC | MONOLITHIC CER | PANASONIC, JAPAN |
| C10 | .1MFD/MLC | MONOLITHIC CER | PANASONIC, JAPAN |
| C11 | 10MFD/16V | ELECTROLYTIC | PANASONIC, JAPAN |
| C12 | .1MFC/MLC | MONOLITHIC CER | PANASONIC, JAPAN |
| D1 | 1N4148 | SILICON DIODE | PHILIPS, ENGLAND |
| D2 | 1N4148 | SILICON DIODE | PHILIPS, ENGLAND |
| D3 | 1N4148 | SILICON DIODE | PHILIPS, ENGLAND |
| D4 | 1N4148 | SILICON DIODE | PHILIPS, ENGIAND |
| D5 | 1N4148 | SILICON DIODE | PHILIPS, ENGLAND |
| FE1 | TFMT 5380 | IR MODULE | TELEFUNKEN, GERMANY |
| LED1, LED 2 | RED LED | RED LED | LITEON INC., MILPITAS, CA |
| 136 | TRANSMITTER | I RED SAA 3007 CHIP | PHILLIPS, ENGLAND |
| 138 | TRANSMITTER | I RED SAA 3007 CHIP W/ (8) CARBON BUTTONS | PHILLIPS, ENGLAND |
| M1 | 6VDC | | DC MOTOR, JAPAN |
| Q1 | MPSA42 | NPN TRANSISTOR | MOTOROLA, PHOENIX, AZ |
| Q2 | MPSA42 | NPN TRANSISTOR | MOTOROLA, PHOENIX, AZ |

TABLE I-continued

FIG. 6

| Ref: | Value: | Item: | Origin: |
|---|---|---|---|
| Q3 | MPSA92 | PNP TRANSISTOR | MOTOROLA, PHOENIX, AZ |
| Q4 | MPSA92 | PNP TRANSISTOR | MOTOROLA, PHOENIX, AZ |
| R1 | 220 OHM | CARBON RESISTOR | IRC, BOONE, NC |
| R2 | 47K OHM | CARBON RESISTOR | IRC, BOONE, NC |
| R3, R12 | 120 OHM | CARBON RESISTOR | IRC, BOONE, NC |
| R4 | 68K OHM | CARBON RESISTOR | IRC, BOONE, NC |
| R5 | 100K OHM | CARBON RESISTOR | IRC, BOONE, NC |
| R6 | 27K OHM | CARBON RESISTOR | IRC, BOONE, NC |
| R7 | 470K OHM | CARBON RESISTOR | IRC, BOONE, NC |
| R8 | 470K OHM | CARBON RESISTOR | IRC, BOONE, NC |
| R9 | 100K OHM | CARBON RESISTOR | IRC, BOONE, NC |
| R10 | 51K OHM | CARBON RESISTOR | IRC, BOONE, NC |
| R11 | 27K OHM | CARBON RESISTOR | IRC, BOONE, NC |
| S1 | MICROSWITCH | LIMIT SWITCH | OMRON, SCHAUMBURG, IL |
| S2 | MICROSWITCH | LIMIT SWITCH | OMRON, SCHAUMBURG, IL |
| S3 | REED SWITCH | REED | HAMLIN INC., LAKE MILLS, WISCONSIN |
| U1 | SAA3049 | IR DECODER IC | PHILIPS, ENGLAND |
| U2 | LM358 | DUAL OP-AMP | MOTOROLA, PHOENIX, AZ |
| U3 | PIC16C56 | U-COMP | MICROCHIP TECH., CHANDLER, ARIZONA |
| Y1 | 4 MHZ XTAL | RESONATOR | PANASONIC, JAPAN |
| Y2 | 32.768 KHZ | CRYSTAL | PANASONIC, JAPAN |

Figure 7A:
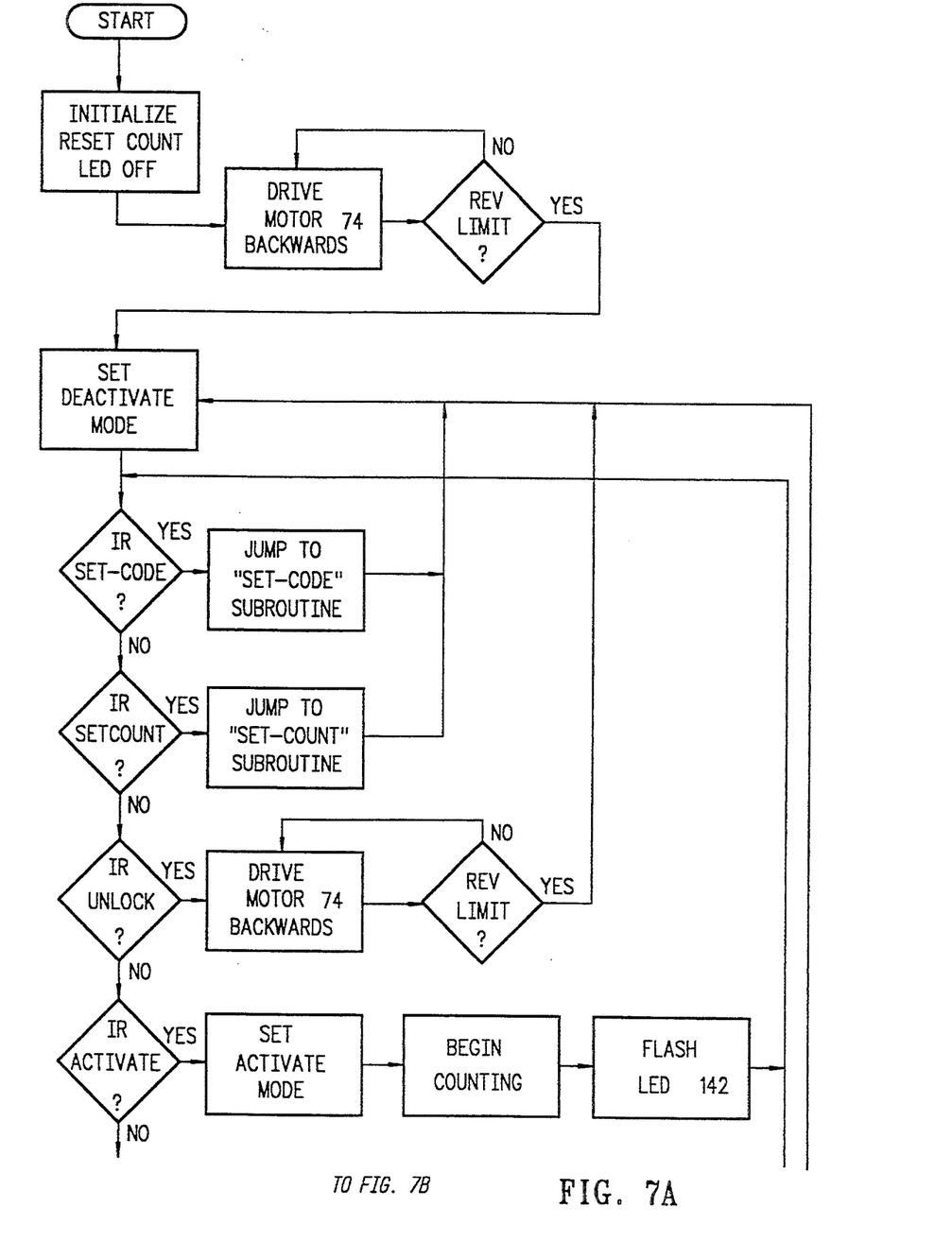
FIG. 7 is a flow diagram of functions programmed into the control means of the present invention.
Figure 7B:
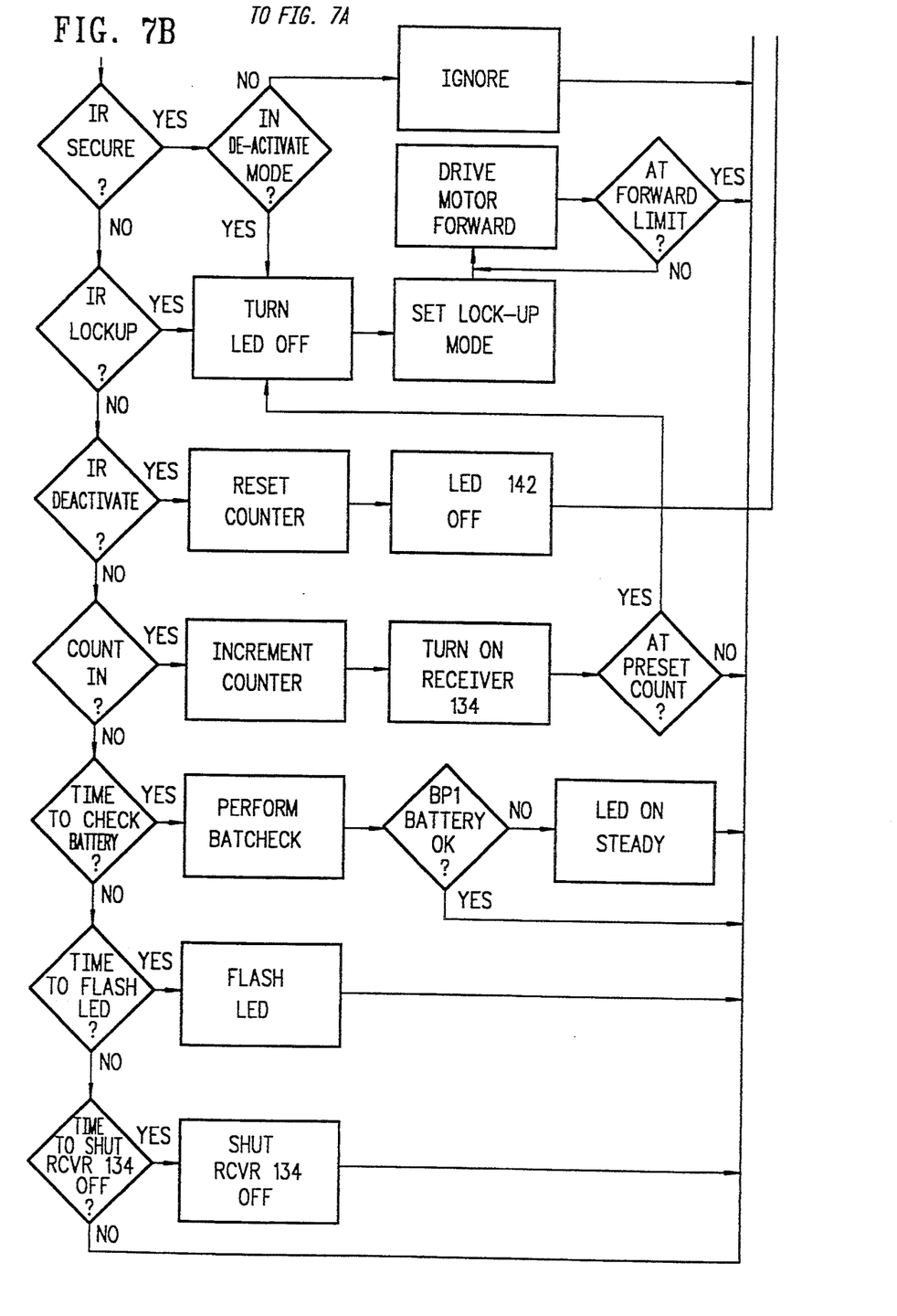

FIG. 7 represents a flow diagram representing the functions programmed into the security device of the present application. The buttons represented in the figure indicate multiple buttons 140 which may be found on IR transmitter 138. An appendix to the application represents the object code which may be programmed into microprocessor U3 to perform the functions shown on FIG. 7.

In operation, unit 62 is assembled by utilizing fasteners 54 to connect yoke 30 to housing 12. Such assembly permits wheel 34 to turn within yolk 30 about axle 32. The components described hereinbefore are, of course, assembled within housing 12, including control means 122 on circuit board 124. Unit 62 is connected to cart 70 by the use of shaft 64 which is sized to fit within a socket normally associated with a cart (not shown) that is capable of accepting a cart wheel. In other words, unit 62 is substituted for the original cart wheel. Turning now to FIG. 3, cart 70 is depicted having two units 62 installed. However, a single such unit 62 may suffice in most cases with respect to a cart 70. With reference to FIG. 7, the security device 10 is capable of seven functions, which will be discussed separately as follows:
1. ACTIVATE
2. DEACTIVATE
3. SET COUNT
4. LOCKUP
5. UNLOCK
6. SECURE
7. SET SECURITY CODE 1. ACTIVATE: To ACTIVATE device 10, infrared receiver 134 receives a discreet infrared signal from infrared transmitter 138 through window 135. The infrared receiver 134 through decoder U1 will generate a command signal to microcomputer U3 to set the count total to zero (0). At this point, reed switch 130, S3, will commence counting passage of permanent magnet 132 on wheel 34. LED 142 is also initiated at this time, flashing brightly approximately every two (2) seconds for a short duration until LOCKUP is reached or another overriding command is received from decoder U1. Such "count" output is sent to microcomputer U3 as shown on FIG. 6. Since the diameter of wheel 34 is known, a distance is measured by the number of reed switch 130 closures. Microcomputer U3 compares the number of total registered reed switch 130 closures to a pre-programmed maximum allowable number, the SET COUNT number.

2. DEACTIVATE: A deactivate a separate discreet infrared command initiates the DEACTIVATE sequence through infrared receiver 134. The DEACTIVATE signal from decoder U1 overrides the ACTIVATE command and immediately stops the counting sequence. At this time, the total count is restored or reset to zero (0) turning off LED 142.

3. SET COUNT: The SET COUNT sequence is initiated by a separate and discreet infrared command originating with transmitter 138. The SET COUNT sequence selects a number of closures of magnetic reed switch 130 in incremental values. In other words, a particular button of plurality of buttons 140 of transmitter 138 would be continually pushed to increase the permissible travel of wheel 34. For example, each time the particular button in the SET COUNT sequence is pushed, fifty (50) yards could be added to the travel of wheel 34. Of course, other distance increments may be used in this aspect of the present invention. Entering the SET COUNT sequence sets the permissible number of reed switch closures to zero (0). The incremental number of closures to be preset can then be entered. The LED 142 flashes rapidly when the SET COUNT is returned to zero (0). Thus, the user receives the signal indicating the distance of travel starting point.

4. LOCKUP: The LOCKUP command overrides either ACTIVATE or DEACTIVATE. LOCKUP initiates by the discreet infrared command to infrared receiver 134 or by the total switch closure count reaching the maximum SET COUNT number set into control means 122. Thus, the LOCKUP sequence may be initiated, by the decoder U2 signaling microcomputer U3 when transmitter 138 sends an IR signal to receiver 134. In either case, the U-3 output trigger means 75 also achieves this result when the count limit is reached by the turning of wheel 34 and motor M1 in a forward direction. At this point, element 72 enters recess 42 of wheel hub 36. Power for motor M1 is received from battery pack 146. In this regard, motor M1 causes element 72 to enter the LOCKUP mode by rotating threaded jacking screw 88 which pivots cam plates 106 and 108 about pivot pin 110. Movement of cam plates 106 and 108 is initiated by the engagement of LOCKUP springs 96 and 98 on lug 100 by the movement of tabs 90 and 92 along jacking screw 88. Thus, microcomputer U3 serves as trigger means 75 for starting motor 74, M1, either in a forward or backward direction. The forward limit of jacking screw 88 and, thus, locking element 72 is controlled by microswitch 116 contacting tab 92. Likewise, the retraction limit of element 72 is determined by microswitch 114 contacting tab 90. With reference to FIG. 6, it may be apparent that the microswitch signals are sent to microcomputer U3 through the appropriate port. LOCKUP may also take the form of a braking action where element 72 contacts tire 38 of wheel 34, FIG. 5A. In addition, the LOCKUP signal may be translated into simple visual or audio alarm means 148 which may be mounted on housing 12 in the form of LED-2. In such case, motor 74 and locking element 72 would not be used. In the event locking element 72 is not aligned with either cavity or recess 40 or 42 of wheel 34 at the time of LOCKUP, LOCKUP spring 96 will absorb the forward travel of tab 90 until further rotation of wheel 34 permits locking element 72 to enter either recess 40 or 42. The security device 10 will remain in this condition until the UNLOCK command is received by microcomputer U3.

5. UNLOCK: The UNLOCK command is initiated by a discreet infrared signal transmitted to receiver 134 and sent to microcomputer U3 from decoder U1. The UNLOCK command is incompatible with the DEACTIVATE, SET COUNT, OR SET CODE modes. Thus, when any of these commands are in effect the command has no effect. Once the UNLOCK command is received, microprocessor U3 triggers battery pack 146 to apply power to motor 74, M1, in the reverse direction. In this position, drive tab 92 moves cam plates 106 and 108 in a clockwise direction, FIG. 4, to retract locking element 72 from recess 42 of wheel 34. Once the backward limit of the travel is detected through microswitch 114, microcomputer U3 disconnects power from motor 74, M1. Again, LOCKUP spring 98 is able to absorb travel of drive tab 92 if element 72 is temporarily jammed by the movement of wheel 34 during this operation. The electronic circuitry through microprocessor U3 also restores the system to the DEACTIVATE mode at this time.

6. SECURE: The SECURE sequence is initiated by a discreet infrared command to receiver 134. Decoder U2 sends this signal to microcomputer U3 which checks to verify if the system is in the ACTIVATE mode. If it is not, the system enters the LOCKUP mode as described above. If the system is in the ACTIVATE mode, the SECURE command is ignored. Thus, the SECURE command will only supersede the DEACTIVATE command. Once in the SECURE mode, the device 10 will only accept the UNLOCK command.

7. SET SECURITY CODE: The SET SECURITY CODE command can only be transmitted by a discreet signal originating with a master transmitter similar to transmitter 138 appropriately programmed and used in conjunction with receiver 134. The SET SECURITY CODE programs the microprocessor for the four (4) button sequence needed to access the SET COUNT sequence. This feature provides protection against unauthorized changes to the preset distances cart 70 is allowed to travel before LOCKUP made is activated. Thus, controller 122 will only ACTIVATE when the SECURITY CODE is transmitted through receiver 134. It should also be noted that, LED 142 will continuously light when battery pack 146 reaches a pre-programmed low voltage value.

While, in the foregoing, embodiments of the present invention have been set forth in considerable detail for the purposes of making a complete disclosure of the invention, it may be apparent to those of skill in the art that numerous changes may be made in such details without departing from the spirit and principles of the invention.

APPENDIX

| | | | | | | | | |
|---|---|---|---|---|---|---|---|---|
| 87 | 000- | B33 | 138 | | | 188 | 03A- | 70E A26 |
| 88 | 001- | BA7 | 139 | 01B- | 6E6 | 189 | 03C- | 72E A26 |
| 89 | 002- | BAE | 140 | 01C- | A1B | 190 | 03E- | 426 |
| 90 | 003- | B67 | 141 | | | 191 | 03F- | C00 005 |
| 91 | 004- | B71 | 142 | 01D- | 486 | 192 | 041- | 078 |
| 92 | | | 143 | 01E- | 4A6 | 193 | 042- | A26 |
| 93 | | | 144 | 01F- | A21 | 194 | | |
| 94 | | | 145 | | | 195 | | |
| 95 | | | 146 | 020- | A26 | 196 | | |
| 96 | | | 147 | | | 197 | | |
| 97 | 005- | | 148 | | | 198 | | |
| 98 | | | 149 | | | 199 | | |
| 99 | | | 150 | | | 200 | | |
| 100 | | | 151 | | | 201 | 043- | 655 |
| 101 | | | 152 | | | 202 | 044- | 800 |
| 102 | | | 153 | 021- | 000 | 203 | | |
| 103 | 1FF- | A05 | 154 | 022- | 06C | 204 | 045- | 586 |
| 104 | | | 155 | 023- | 06D | 205 | 046- | 4A6 |
| 105 | | | 156 | 024- | 06E | 206 | 047- | 7E6 |
| 106 | | | 157 | 025- | 52E | 207 | 048- | A47 |
| 107 | | | 158 | | | 208 | | |
| 108 | | | 159 | | | 209 | 049- | 6E6 |
| 109 | | | 160 | | | 210 | 04A- | A49 |
| 110 | 005- | 000 | 161 | | | 211 | 04B- | 486 |
| 111 | | | 162 | 026- | 765 | 212 | 04C- | 4A6 |
| 112 | 006- | C44 03A | 163 | 027- | 959 | 213 | 04D- | 800 |

APPENDIX-continued

| # | Addr | Value | # | Addr | Value | # | Addr | Value |
|---|------|-------|---|------|-------|---|------|-------|
| 113 | 008- | C55 03B | 164 | | | 214 | | |
| 114 | | | 165 | | | 215 | | |
| 115 | 00A- | CFF 005 | 166 | 028- | 900 | 216 | | |
| 116 | 00C- | CC4 006 | 167 | | | 217 | | |
| 117 | 00E- | C17 | 168 | 029- | 6C6 | 218 | 04E- | 675 |
| 118 | | | 169 | 02A- | A34 | 219 | 04F- | 800 |
| 119 | 00F- | 002 | 170 | | | 220 | | |
| 120 | | | 171 | 02B- | 6D5 | 221 | 050- | 486 |
| 121 | 010- | 783 | 172 | | | 222 | 051- | 5A6 |
| 122 | 011- | A20 | 173 | 02C- | A35 | 223 | 052- | 7E6 |
| 123 | | | 174 | | | 224 | 053- | A52 |
| 124 | 012- | C00 025 | 175 | 02D- | 72E | 225 | | |
| 125 | 014- | C00 026 | 176 | 02E- | 903 | 226 | 054- | 6E6 |
| 126 | 016- | 06C | 177 | | | 227 | 055- | A54 |
| 127 | 017- | 06D | 178 | 02F- | 078 | 228 | 056- | 486 |
| 128 | | | 179 | 030- | CFF 005 | 229 | 057- | 4A6 |
| 129 | 018- | 586 | 180 | 032- | 526 | 230 | 058- | 800 |
| 130 | 019- | 4A6 | 181 | 033- | A35 | 231 | | |
| 131 | | | 182 | | | 232 | | |
| 132 | 01A- | 901 | 183 | 034- | 4D5 | 233 | | |
| 133 | | | 184 | | | 234 | | |
| 134 | | | 185 | | | 235 | 059- | 000 |
| 135 | | | 186 | 035- | 000 | 236 | 05A- | 665 |
| 136 | | | 187 | 036- | C5A | 237 | 05B- | A82 |
| 137 | | | | 098 | 703 A26 | 238 | 05C- | 6B5 |
| 239 | 05D- | 800 | 282 | | | 326 | 0D8- | 800 |
| 240 | 05E- | 5B5 | 283 | | | 327 | | |
| 241 | 05F- | 205 02F | 284 | | | 328 | | |
| 242 | 061- | 6CE | 285 | | | 329 | | |
| 243 | 062- | A84 | 286 | | | 330 | 0D9- | 000 |
| 244 | 063- | 6AE | 287 | | | 331 | 0DA- | 72E |
| 245 | 064- | AA6 | 288 | | | 332 | 0DB- | 800 |
| 246 | | | 289 | 0A6- | 000 | 333 | | |
| 247 | 065- | C00 08F | 290 | 0A7- | C01 | 334 | 0DC- | 076 |
| | 643 | AD9 | | 094 | 643 AB8 | 335 | 0DD- | 596 |
| 248 | 069- | C01 08F | 291 | 0AB- | C02 | 336 | 0DE- | 536 |
| | 643 | AE2 | | 094 | 643 ABE | 337 | | |
| 249 | 06D- | C02 08F | 292 | 0AF- | C03 | 338 | 0DF- | 06E |
| | 643 | AE9 | | 094 | 643 AC4 | 339 | 0E0- | 50E |
| 250 | 071- | C03 08F | 293 | 0B3- | C04 | 340 | 0E1- | 800 |
| | 643 | AFB | | 094 | 643 ACA | 341 | | |
| 251 | 075- | C04 08F | 294 | 0B7- | ACF | 342 | 0E2- | 000 |
| | 643 | B0F | 295 | | | 343 | 0E3- | 70E |
| 252 | 079- | C05 08F | 296 | 0B8- | 210 | 344 | 0E4- | 800 |
| | 643 | B1E | | 08F | 743 | 345 | | |
| 253 | 07D- | C06 08F | 297 | 0BB- | 5F5 | 346 | 0E5- | 076 |
| | 643 | B2D | 298 | 0BC- | 2B4 | 347 | | |
| 254 | 081- | 800 | 299 | 0BD- | 800 | 348 | | |
| 255 | | | 300 | | | 349 | 0E6- | 06E |
| 256 | 082- | 4B5 | 301 | 0BE- | 211 | 350 | 0E7- | 52E |
| 257 | 083- | 800 | | 08F | 743 | 351 | 0E8- | 800 |
| 258 | | | 302 | 0C1- | 5F5 | 352 | | |
| 259 | 084- | 000 | 303 | 0C2- | 2B4 | 353 | 0E9- | 000 |
| 260 | 085- | C01 094 | 304 | 0C3- | 800 | 354 | | |
| | 643 | A97 | 305 | | | 355 | 0EA- | C06 094 |
| 261 | 089- | C02 094 | 306 | 0C4- | 212 | | 643 | AFA |
| | 643 | A9A | | 08F | 743 | 356 | 0EE- | C07 094 |
| 262 | 08D- | C03 094 | 307 | 0C7- | 5F5 | | 643 | AFA |
| | 643 | A9D | 308 | 0C8- | 2B4 | 357 | | |
| 263 | 091- | C04 094 | 309 | 0C9- | 800 | 358 | 0F2- | 60E AF6 |
| | 643 | AA0 | 310 | | | 359 | 0F4- | 72E |
| 264 | 095- | 074 | 311 | 0CA- | 213 | 360 | 0F5- | 800 |
| 265 | 096- | 800 | | 08F | 643 | 361 | 0F6- | 06E |
| 266 | | | 312 | 0CD- | 7F5 | 362 | 0F7- | 56E |
| 267 | 097- | 20F 030 | | AD2 | | 363 | 0F8- | 94E |
| 268 | 099- | AA4 | 313 | 0CF- | 074 | 364 | 0F9- | 800 |
| 269 | | | 314 | 0D0- | 4F5 | 365 | | |
| 270 | 09A- | 20F 031 | 315 | 0D1- | 800 | 366 | 0FA- | 535 |
| 271 | 09C- | AA4 | 316 | | | 367 | | |
| 272 | | | 317 | | | 368 | | |
| 273 | 09D- | 20F 032 | 318 | | | 369 | 0FB- | 000 |
| 274 | 09F- | AA4 | 319 | 0D2- | 06E | 370 | 0FC- | C05 094 |
| 275 | | | 320 | 0D3- | 5AE | | 643 | B0A |
| 276 | 0A0- | 20F 033 | 321 | 0D4- | 079 | 371 | 100- | 60E B06 |
| 277 | 0A2- | 074 | 322 | 0D5- | C05 | 372 | 102- | 66E B06 |
| 278 | 0A3- | 800 | | 034 | | 373 | 104- | 78E |
| 279 | | | 323 | | | 374 | 105- | 800 |
| 280 | 0A4- | 2B4 | 324 | 0D7- | 904 | 375 | 106- | 06E |
| 281 | 0A5- | 800 | 325 | | | 376 | 107- | 54E |
| 377 | 108- | 943 | 429 | | | 474 | 160- | D00 |
| 378 | 109- | 800 | 430 | 13C- | CFF | 475 | 161 | 643 B64 |
| 379 | 10A- | C04 039 | | 037 | | 476 | 163- | |

APPENDIX-continued

| # | Col A | Col B | # | Col A | Col B | # | Col A | Col B |
|---|---|---|---|---|---|---|---|---|
| 380 | 10C- | C06 034 | 431 | 13E- | B45 | 477 | 163- | 800 |
| 381 | 10E- | 800 | 432 | | | 478 | | |
| 382 | | | 433 | 13F- | C2C | 479 | 164- | 436 |
| 383 | 10F- | 000 | | 037 | | 480 | 165- | 416 |
| 384 | 110- | C05 094 | 434 | 141- | B45 | 481 | 166- | |
| | 643 | B19 | 435 | | | 482 | 166- | 800 |
| 385 | 114- | 72E | 436 | 142- | C02 | 483 | | |
| 386 | 115- | 800 | | 037 | | 484 | | |
| 387 | 116- | 06E | 437 | 144- | B45 | 485 | 167- | 000 |
| 388 | 117- | 58E | 438 | | | 486 | 168- | 7C6 |
| 389 | 118- | 800 | 439 | 145- | 636 | 487 | 169- | 902 |
| 390 | 119- | C05 039 | | B57 | | 488 | 16A- | |
| 391 | 11B- | C06 034 | 440 | 147- | 716 | 489 | 16A- | 7C6 |
| 392 | 11D- | 800 | | B51 | | 490 | 16B- | |
| 393 | | | 441 | | | 491 | 16B- | 800 |
| 394 | 11E- | 000 | 442 | 149- | 201 | 492 | 16C- | 5D5 |
| 395 | | | 443 | 14A- | D00 | 493 | | |
| 396 | 11F- | C07 094 | 444 | 14B- | 643 | 494 | 16D- | 3ED |
| | 643 | B28 | | B4E | | 495 | 16E- | |
| 397 | | | 445 | 14D- | | 496 | 16E- | 800 |
| 398 | | | 446 | 14D- | 800 | 497 | | |
| 399 | | | 447 | | | 498 | 16F- | 2AC |
| 400 | 123- | 06E | 448 | 14E- | 416 | 499 | 170- | |
| 401 | 124- | 5AE | 449 | 14F- | 536 | 500 | 170- | 800 |
| 402 | 125- | C01 034 | 450 | 150- | | 501 | | |
| 403 | 127- | 800 | 451 | 150- | 800 | 502 | | |
| 404 | | | 452 | | | 503 | | |
| 405 | 128- | 06E | 453 | 151- | 217 | 504 | 171- | C06 094 |
| 406 | 129- | 52E | | 021 | | | 643 | B7A |
| 407 | 12A- | 06C | 454 | 153- | C17 | 505 | 175- | C07 094 |
| 408 | 12B- | 06D | 455 | 154- | 002 | | 643 | B7D |
| 409 | 12C- | 800 | 456 | 155- | 516 | 506 | 179- | |
| 410 | | | 457 | 156- | | 507 | 179- | 800 |
| 411 | 12D- | 000 | 458 | 156- | 800 | 508 | | |
| 412 | 12E- | 06E | 459 | | | 509 | 17A- | 06A |
| 413 | 12F- | 5CE | 460 | 157- | 616 | 510 | 17B- | 06B |
| 414 | 130- | C01 034 | | B5F | | 511 | 17C- | 556 |
| 415 | 132- | 800 | 461 | | | 512 | | |
| 416 | | | 462 | | | 513 | 17D- | 735 |
| 417 | | | 463 | | | 514 | 17E- | |
| 418 | | | 464 | 159- | C15 | 515 | 17E- | 800 |
| 419 | | | | 021 | | 516 | | |
| 420 | 133- | 696 B3C | 465 | | | 517 | 17F- | 076 |
| 421 | 135- | 676 B3F | 466 | | | 518 | | |
| 422 | 137- | 656 B42 | 467 | 15B- | C16 | 519 | | |
| 423 | 139- | 62E B3C | 468 | 15C- | 002 | 520 | 180- | C04 099 |
| 424 | | | 469 | 15D- | 516 | | 643 | B89 |
| 425 | 13B- | | 470 | 15E- | | 521 | 184- | C05 099 |
| 426 | 13B- | 800 | 471 | 15E- | 800 | | 643 | B98 |
| 427 | | | 472 | | | 522 | | |
| 428 | | | 473 | 15F- | 201 | 523 | 188- | B88 |
| 524 | | | | | | | | |
| 525 | | | | | | | | |
| 526 | 189- | 403 | | | | | | |
| 527 | 18A- | C2C 1EB | | | | | | |
| 528 | 18C- | 703 | | | | | | |
| 529 | 18D- | B8F | | | | | | |
| 530 | 18E- | 2AA | | | | | | |
| 531 | 18F- | 435 | | | | | | |
| 532 | 190- | 20A 09A | | | | | | |
| | 703 | B95 | | | | | | |
| 533 | 194- | BA4 | | | | | | |
| 534 | 195- | 06A | | | | | | |
| 535 | 196- | 06B | | | | | | |
| 536 | 197- | 556 | | | | | | |
| 537 | | | | | | | | |
| 538 | 198- | 403 | | | | | | |
| 539 | 199- | C37 1EB | | | | | | |
| 540 | 19B- | 703 | | | | | | |
| 541 | 19C- | B9E | | | | | | |
| 542 | 19D- | 2AA | | | | | | |
| 543 | 19E- | 435 | | | | | | |
| 544 | 19F- | 20A 09B | | | | | | |
| | 703 | B95 | | | | | | |
| 545 | 1A3- | BA4 | | | | | | |
| 546 | | | | | | | | |
| 547 | 1A4- | C07 034 | | | | | | |
| 548 | 1A6- | | | | | | | |
| 549 | 1A6- | 800 | | | | | | |
| 550 | | | | | | | | |
| 551 | | | | | | | | |
| 552 | | | | | | | | |

APPENDIX-continued

| | | |
|---|---|---|
| 553 | 1A7- | CFF 029 |
| 554 | 1A9- | 2E8 BA9 |
| 555 | 1AB- | 2E9 BA9 |
| 556 | 1AD- | |
| 557 | 1AD- | 800 |
| 558 | | |
| 559 | | |
| 560 | | |
| 561 | | |
| 562 | 1AE- | C05 029 |
| 563 | 1B0- | 2E8 BB0 |
| 564 | 1B2- | 2E9 BB0 |
| 565 | 1B4- | |
| 566 | 1B4- | 800 |
| 567 | | |

Errors: 0 = = = = = =

What is claimed is:

1. A security device for a cart wheel, comprising:
   a. a housing;
   b. mounting means for holding said housing to the cart in the vicinity of the wheel;
   c. an element supported to said housing and being selectively movable into positions engaging the cart wheel and being disengaged from the cart wheel;
   d. a motor for moving said element;
   e. control means for activating said motor, said control means including a counter for determining the number of revolutions completed by the wheel, trigger means for starting said motor upon receipt of a signal from said counter of a preselected number of revolutions completed by the wheel.

2. The device of claim 1 in which said control means further comprises means for activating said control means.

3. The device of claim 1 in which said control means further comprises count setting means for arming said trigger means based on a preselected number of revolutions completed by the wheel.

4. The device of claim 1 which additionally comprises securing means for preventing activation of said control means, said securing means including a code generator and a receiver for recognizing a code originating with said code generator and producing a signal capable of activating said control means.

5. The device of claim 4 in which said securing means includes a transmitter for remotely sending said signal originating in said code generator.

6. The device of claim 1 in which said element is capable of slidingly contacting the wheel during said position of said element engaging the cart wheel.

7. The device of claim 1 in which said element is capable of interrupting the revolution of the wheel during said position of said element engaging the cart wheel.

8. The device of claim 1 in which said element includes a movable pin, and said motor includes a shaft and means for linking said shaft to said movable pin.

9. The device of claim 8 in which said means for linking said shaft to said movable pin includes a lever, one arm of said lever connecting to said movable pin and another arm of said lever connecting to said shaft.

10. The device of claim 1 which additionally comprises a source of electrical power and said trigger means electrically connects said source of electrical power to said motor when starting said motor.

11. The device of claim 1 in which said motor is capable of moving said element in reciprocal directions.

12. The device of claim 1 in which said counter includes a magnet located on the cart wheel and a switch connected to said housing, said switch being capable of closing under the influence of said magnet and subsequently opening when outside the influence of said magnet, said switch closing reprinting a revolution of the wheel.

13. A security device for a cart wheel, comprising:
   a. an alarm;
   b. means for mounting said alarm to the cart;
   c. control means for activating said alarm, said control means including a counter for determining the number of revolutions completed by the wheel, trigger means for initiating said alarm upon receipt of a signal from said counter after a preselected number of revolutions completed by the wheel.

* * * * *